US011343012B2

(12) United States Patent
Malpani et al.

(10) Patent No.: US 11,343,012 B2
(45) Date of Patent: May 24, 2022

(54) NOISE GENERATION FOR DIFFERENTIAL PRIVACY

(71) Applicant: Microsoft Technology Licensing, LLC, Redmond, WA (US)

(72) Inventors: Anjaneya Malpani, Bellevue, WA (US); Jagadeesh Virupaksha Huliyar, Redmond, WA (US); Xinyun Sun, Kirkland, WA (US); Sreeram Nivarthi, Redmond, WA (US); Muthukrishnan Paramasivam, Seattle, WA (US); Dheepak Ramaswamy, Seattle, WA (US); Sriradha Selvaraj, Redmond, WA (US); Ananthatejas Raghavan, Redmond, WA (US); Sergey Yekhanin, Redmond, WA (US); Janardhan Kulkarni, Seattle, WA (US); Aleksey Ashikhmin, Redmond, WA (US); Sivakanth Gopi, Redmond, WA (US); Bingran Luo, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 275 days.

(21) Appl. No.: 16/809,900

(22) Filed: Mar. 5, 2020

(65) Prior Publication Data

US 2021/0281483 A1 Sep. 9, 2021

(51) Int. Cl.
*H04K 1/02* (2006.01)
*H04W 12/02* (2009.01)
(Continued)

(52) U.S. Cl.
CPC ............ *H04K 1/02* (2013.01); *G06F 16/248* (2019.01); *H04L 41/0883* (2013.01); *H04W 12/02* (2013.01); *H03M 13/3961* (2013.01); *H03M 13/4107* (2013.01); *H03M 13/4192* (2013.01); *H03M 13/6502* (2013.01)

(58) Field of Classification Search
CPC ................................ H04K 1/02; H04W 12/02
See application file for complete search history.

(56) References Cited

U.S. PATENT DOCUMENTS 8,619,984 B2 * 12/2013 McSherry ................ H04K 1/02
380/252
10,108,818 B2 * 10/2018 Curcio ................ G06F 21/6245
(Continued)

OTHER PUBLICATIONS

"Erlang Distribution", Retrieved from: https://web.archive.org/web/20190925205202/https://en.wikipedia.org/wiki/Erlang_distribution, Retrieved Date: Sep. 25, 2019, 05 Pages.
(Continued)

Primary Examiner — Joseph D Torres
(74) Attorney, Agent, or Firm — Schwegman Lundberg & Woessner, P.A.

(57) ABSTRACT

A system and method for applying noise to data is described. The system accesses a metric value of a metric of each user from a group of users of an application. The metric indicates a measure of an operation of the application by a corresponding user. The system generates noise values and defines a distribution of the noise values to the group of users. The system modifies the metric value of the metric of each user with a corresponding noise value from the noise values based on the distribution.

20 Claims, 14 Drawing Sheets

(51) Int. Cl.
*G06F 16/248* (2019.01)
*H04L 41/08* (2022.01)
*H03M 13/39* (2006.01)
*H03M 13/41* (2006.01)
*H03M 13/00* (2006.01)

(56) References Cited

U.S. PATENT DOCUMENTS

| | | | | |
|---|---|---|---|---|
| 10,325,114 | B2 * | 6/2019 | Shen | G06F 21/6263 |
| 11,024,299 | B1 * | 6/2021 | Drake | G06F 21/6245 |
| 2009/0254971 | A1 * | 10/2009 | Herz | G06Q 30/0603 726/1 |
| 2010/0162402 | A1 | 6/2010 | Rachlin et al. | |
| 2015/0235051 | A1 * | 8/2015 | Fawaz | G06F 21/6245 726/26 |
| 2021/0012028 | A1 * | 1/2021 | Cabot | G06F 17/12 |

OTHER PUBLICATIONS

"Exponential Laplace Theorem", Retrieved from: https://web.archive.org/web/20191119200920/http://www.math.wm.edu/~leemis/chart/UDR/PDFs/ExponentialLaplace.pdf, Retrieved Date: Nov. 19, 2019, 02 Pages.

"Learning with Privacy at Scale", In Apple Machine Learning Journal, vol. 1, Issue 8, Dec. 2017, pp. 1-25.

Ding, et al., "Collecting Telemetry Data Privately", In Proceedings of the Conference on Neural Information Processing Systems, Dec. 4, 2017, 10 Pages.

Dwork, et al., "The Algorithmic Foundations of Differential Privacy", In Foundations and Trends in Theoretical Computer Science, vol. 9, No. 3-4, Aug. 11, 2014, 281 Pages.

Erlingsson, et al., "RAPPOR: Randomized Aggregatable Privacy-Preserving Ordinal Response", In Proceedings of the ACM SIGSAC Conference on Computer and Communications Security, Nov. 3, 2014, pp. 1054-1067.

Mivule, Kato, "Utilizing Noise Addition for Data Privacy, an Overview", In Journal of the Computing Research Repository, Sep. 16, 2013, 07 Pages.

Sarathy, et al., "Evaluating Laplace Noise Addition to Satisfy Differential Privacy for Numeric Data.", IN Journal of Transactions on Data Privacy, vol. 4, Issue 1, Apr. 2011, pp. 1-17.

Bennett, Cyphers, "Understanding Differential Privacy and why it matters for Digital Rights—Access Now", Retrieved From: http://web.archive.org/web/20191029151040/https://www.accessnow.org/understanding-differential-privacy-matters-digital-rights/, Oct. 25, 2017, pp. 1-5.

"International Search Report and Written Opinion issued in PCT Application No. PCT/US21/014045", dated Apr. 16, 2021, 13 Pages.

* cited by examiner

NOISE GENERATION FOR DIFFERENTIAL PRIVACY

TECHNICAL FIELD

The subject matter disclosed herein generally relates to a special-purpose machine that generates and applies noise to metrics data of users of an application, including computerized variants of such special-purpose machines and improvements to such variants. Specifically, the present disclosure addresses systems and methods for distributing the noise to the metrics data.

BACKGROUND

Some applications (e.g., document editing applications, communication applications) provide a platform for users to collaborate and interact with one another. The application may also collect data on the user's interactions and usage of the application. The data can be used to generate a report that contains aggregate metrics indicating individual user performance within an organization. Although the report includes anonymous data, a recipient of the report may still be able to identify particular individuals associated with metrics in the report by filtering the data based on user profile attributes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
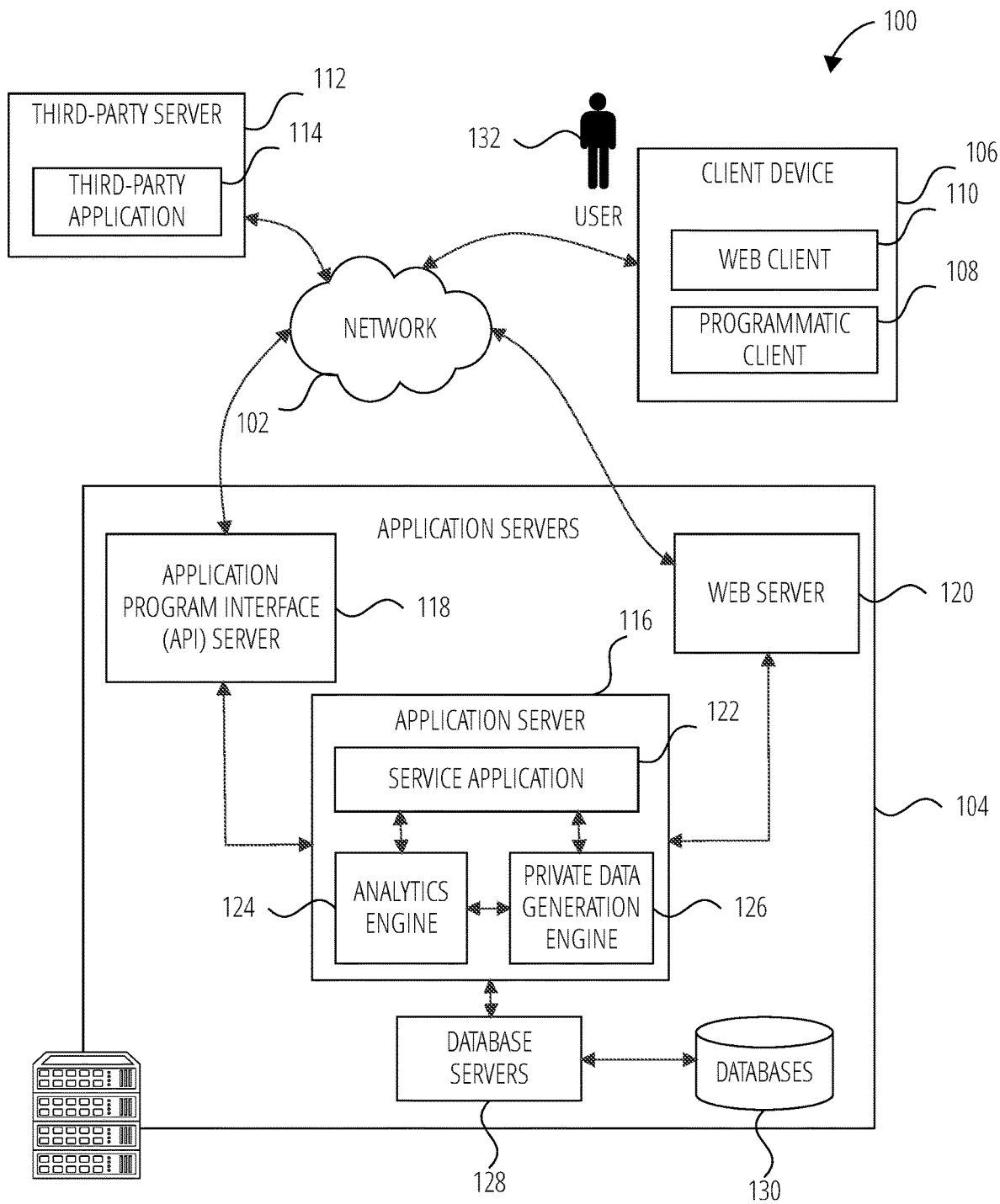
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present application describes a method for ensuring that protecting the privacy of metrics of users of an application while ensuring the accuracy of metrics related to the users of the applications. In one example, the method comprises: generating noise data, determining a distribution of the noise data to the metrics data of users of the application, and applying the noise data to the metrics data based on the distribution. Examples of metrics data includes collaboration data of users of the application in an enterprise environment. The collaboration data measures a level of collaboration activities between users of the application. Other examples of metrics data include after-hours metrics data that measure activities and operations of the application by users outside a preset timeframe (e.g., 9 am to 5 pm). An enterprise represents organizations or groups of users associated with an organization. In particular, the system provides an algorithm that provides privacy to the users of the application by adding random noise to the metrics of each user, while maintaining an accurate representation of an aggregate metric value of true metrics values.

In one example scenario, a manager in an enterprise can view metrics related to members of this team. An example of metrics include an aggregate metric insight. The aggregate metric insight provides an aggregate value of metrics related to the entire team. For example, a manager can view an average after-hours or an average collaboration hours for his/her team. The manager can also drill down by sub-groups led by managers reporting to them. The manager can also drill down based on other user profile attributes such as function type, organization, designation, or other Human Resource (HR) attributes.

However, a manager may still be able to deduce or infer metrics related an individual member of the team by filtering the metrics based on sub-groups or user profiles. For example, if an employee is identified as out-of-the office, a manager could reverse-compute or guess the metric value or its range for that employee. In another example, a manager could drill down in such a manner that he/she can reverse-compute or guess the value or range for an employee. In a situation where, in three sets only one employee is common or few employees are common, and the manager knows values for the some of these employees, then the manager can reverse-compute the value for that employee. In another situation, if a manager knows the values for most employees in a sub-group, then a manager could reverse-compute or guess the metric value or range for an employee of a small group of employees.

The present application describes an algorithm that protects privacy within a certain defined range. The effect of the algorithm on the accuracy of the result are within a given range of maximum value for each metric. This enables the results of the algorithms to still be usable and the metric values can be used by managers to track their teams progress.

In one example embodiment, the present application describes a system that protects privacy by adding noise to the data. This enables the system to hide the actual true value of the metric while the noise cancelled out at aggregation level. Since drill downs and pivots of drill down are allowed, the present system adds noise at the level of individual metric. This ensures that whatever pivot is applied to slide/dice the metrics, the aggregated value always includes added noise and the experience is kept consistent during the drill down/up. In other words, a manager may not be able to differentiate the true value of a metric from the noise-added value of the metric.

The added noise includes random noise so that the noise cannot be predicted or computed even when someone is aware of the algorithm or method used to generate noise. However, random noise is difficult to ascertain so that the accuracy of the metrics is not affected. The random noise added along with slide/dice could result in aggregate of noise values that is very different from the aggregate of true value. The present application describes a random noise generator whose distribution can be defined and has guaranteed privacy levels. The distribution can be customized to achieve a minimum level of accuracy.

In one example embodiment, a system and method for applying noise to metrics data in an application is described. The system accesses a metric value of a metric of each user from a group of users of an application, the metric indicating a measure of an operation of the application by a corresponding user. The system generates a plurality of noise values. Each noise value comprises a random value within a noise range. The system defines a distribution of the plurality of noise values to the group of users. The system modifies the metric value of the metric of each user with a corresponding noise value from the plurality of noise values based on the distribution. The system also receives, from a client device, a query related to an aggregate metric of the group of users. The system performs an operation on the modified metric values of the metric of the group of users and provides, to the client device, a response based on a result of the operation.

As a result, one or more of the methodologies described herein facilitate solving the technical problem of optimizing user operations of an application. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 132 operates the client device 106. The client device 106 includes a web client 110 (e.g., a browser), a programmatic client 108 (e.g., an email/calendar application such as Microsoft Outlook™, an instant message application, a document writing application, a shared document storage application) that is hosted and executed on the client device 106. In one example embodiment, the programmatic client 108 logs interaction data from the web client 110 and the programmatic client 108 with the service application 122. In another example embodiment, the service application 122 logs interaction data between the web client 110, the programmatic client 108, and the service application 122. The interaction data may include, for example, communication logs of communications (e.g., emails) between users of an enterprise or communications between users of the enterprise and outside users of the enterprise. Other examples of interaction data include and are not limited to email communications, meeting communications, instant messages, shared document comments, and any communication with a recipient (e.g., a user from or outside the enterprise). In a first example, the interaction data include metadata of the messages. In a second example, the interaction data include content of the messages.

An Application Program Interface (API) server 118 and a web server 120 provide respective programmatic and web interfaces to application servers 104. A specific application server 116 hosts the service application 122, an analytics engine 124, and a private data generation engine 126. The service application 122, analytics engine 124, and private data generation engine 126 each include components, modules and/or applications.

The service application 122 includes a server side email/calendar enterprise application, a server side instant message enterprise application, a document authoring enterprise application, or a shared document storage enterprise application. The service application 122 enables users of an enterprise to collaborate and share document, messages, and other data (e.g., meeting information, common projects) with each other. For example, the user 132 at the client device 106 accesses and uses the service application 122 to edit documents that are shared with other users of the same enterprise. In another example, the client device 106 accesses and uses the service application 122 to retrieve or send messages or emails to and from other peer users of the enterprise. Other examples of service application 122 includes enterprise systems, content management systems, and knowledge management systems.

In one example embodiment, the analytics engine 124 communicates with the service application 122 and accesses user operation data of the service application 122. The user operation data includes data points that measure the frequency, dates, times of users operating the enterprise application, types of documents being accessed or shared by users of the enterprise application, users calendar data from the enterprise application, communication data between users of the enterprise application, and enterprise organization data (e.g., hierarchy of users within an enterprise).

In another example embodiment, the analytics engine 124 communicates with the programmatic client 108 and accesses operation data (or interaction data with other users of the enterprise) from the user 132 with the programmatic client 108 or web client 110. In one example, the web client 110 communicates with the analytics engine 124 and service application 122 via the programmatic interface provided by the Application Program Interface (API) server 118.

The analytics engine 124 computes operation metrics (e.g., metrics that measure how the application is operated by users of the enterprise) based on operation data of the service application 122 and interaction data between users of the enterprise. The operation data and interaction data is collected by a combination of the service application 122, the item web client 110, or the programmatic client 108. The operation metrics may be associated with an enterprise or a group of user accounts within the enterprise. In one example, the analytics engine 124 measures operation metrics based on operation data of the service application 122 by a group of user accounts of the enterprise. In another example, the analytics engine 124 measures interaction metrics based on interaction data of the group of user accounts using the service application 122. In another example, the analytics engine 124 measures operation metrics based on other filter criteria (group department, group size, group hierarchy —managers, supervisors, team leader, user physical location, office location).

In one example embodiment, the analytics engine 124 computes benchmarks (also referred to as indices) based on operation and/or interaction metrics related to the service application 122 for user accounts of other enterprises or user accounts of the same enterprise. The analytics engine 124 generates a graphical user interface (GUI) indicates the operation/interaction metrics of a group of user accounts of the enterprise relative to the operation/interaction metrics of other groups of user accounts of the enterprise or user accounts of peer enterprises.

The analytics engine 124 indicates a (user-interactive) portion of the GUI that identifies a set of user accounts. The analytics engine 124 generates a configuration setting for the application of the set of user accounts based on the operation/interaction metrics of the set of user accounts relative to the other operation/interaction metrics of other user accounts of the enterprise or of other enterprises. The analytics engine 124 applies the configuration setting to the service application 122 for each user account of the set of user accounts. As such, the service application 122 that is modified by configuration setting for a user account now operates in a different manner (e.g., generating more frequent or less different prompt reminders, modifying a setting of a communication application to automatically schedule one-on-one meetings with a manager, setting a limit to the number of attendees in a meeting).

Examples of configuration settings include changes to how the service application 122 (for a corresponding user) operates at different times. For example, the service application 122 may be configured to turn off any notification during a preset amount of time during the day. In another example, the service application 122 may be configured to generate and display additional reminder notifications to further interact with identified co-workers. In another example, the service application 122 may be configured to generate a dialog box pre-populated with information based on the recommended action (e.g., pre-filled with parameters of a feature of the service application 122). The user 132 only has to click on one button to configure the programmatic client 108 with the new parameters. For example, the pre-filled parameters configure the programmatic client 108 to prevent from retrieving or sending emails between 10 pm and 6 am on weekdays and all day on weekends. Such configuration results in an increase or decrease in operation/interaction metrics of the service application 122 associated with the user account.

The private data generation engine 126 shields the original true value (e.g., raw data) metric of a user from a user (e.g., a manager) of the analytics engine 124. For example, the private data generation engine 126 prevents the manager from accessing, viewing, inferring the raw data for a user, or identifying a user based on different filters being applied to the metrics. The private data generation engine 126 provides privacy protection when presenting aggregation value on arbitrary HR attributes. Furthermore, the private data generation engine 126 modifies the metrics in such a way that query results are consistent regardless of how many times the query has been submitted. In other words, the system remembers or keeps track of the random noise initially applied to the true value to maintain data consistency over time. As a result, the system generates consistent and accurate information when the manager drills up or down the data. In addition to consistency, the system preserves an accuracy of the original true value of the original data (e.g., within a preset error range).

In one example embodiment, private data generation engine 126 adjusts outlier metric values based on system-defined maximum value. The private data generation engine 126 also generates a random noise and applies the random noise to the adjusted value of the metric of a user. For example, the metric for a user over a period of time (e.g., one week) is replaced with a modified value by adding a noise value (from the random noise) to the original true value of the metric. The noise value may be a random variable drawn a distribution algorithm (e.g., Laplace distribution).

The application server 116 is shown to be communicatively coupled to database servers 128 that facilitates access to an information storage repository or databases 130. In an example embodiment, the databases 130 includes storage devices that store information to be processed by the service application 122 and the analytics engine 124.

Additionally, a third-party application 114 may, for example, store another part of the service application 122, or include a cloud storage system. For example, the third-party application 114 stores other metrics related to the enterprises. The metrics may include size of the enterprises, industry classification, and updated revenue. The third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party.

Figure 2:
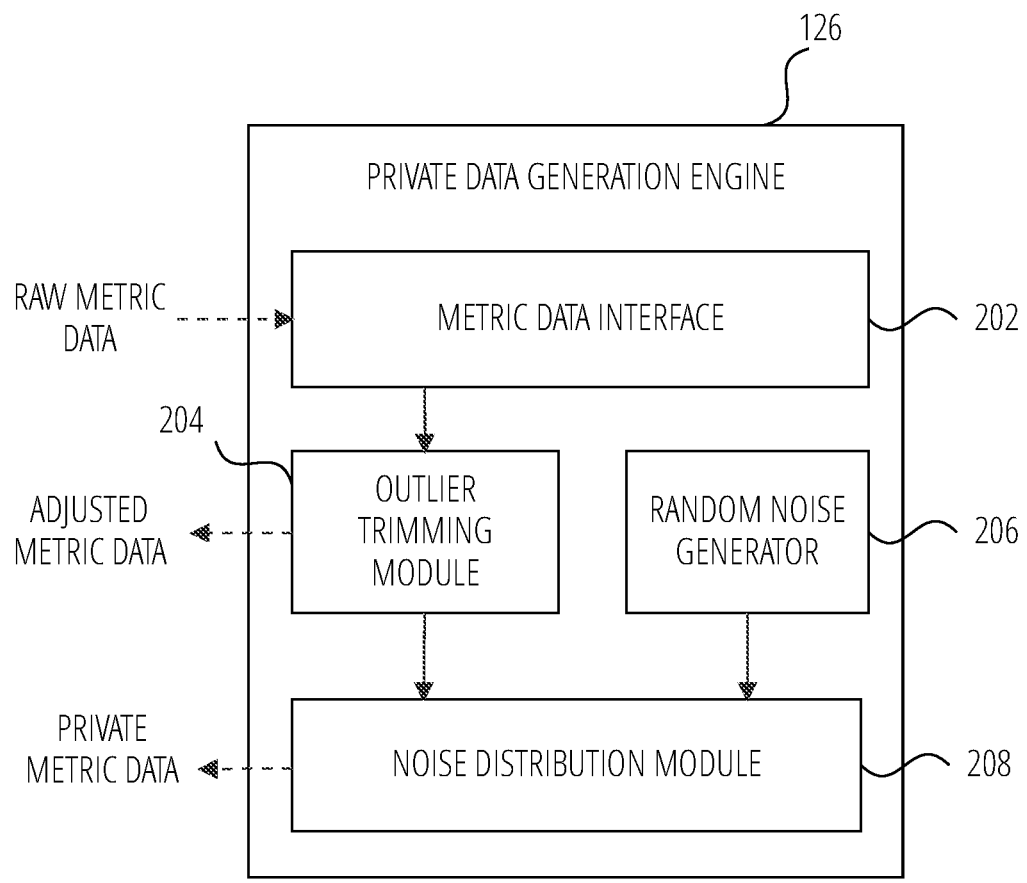
FIG. 2 is a block diagram illustrating a private data generation engine in accordance with one example embodiment.

FIG. 2 is a block diagram illustrating a private data generation engine 126 in accordance with one example embodiment. The private data generation engine 126 includes a metric data interface 202, an outlier trimming module 204, a random noise generator 206, and a noise distribution module 208.

The metric data interface 202 accesses raw metric data from the analytics engine 124. In one example, the analytics engine 124 computes the raw metric data for each user over a set time range (e.g., one-week). The raw metric data includes, for example, the number of hours a user has collaborated with peer users of a team or the organization in the last week. Another example of raw metric data includes the number of after-hours communications (or operations of the service application 122) from a user in the last week.

The outlier trimming module 204 identifies outlier metric data from a group of metric data of a group of users. The identification of outliers may be used using any methods that identifies data outside a boundary range of the metric data from the group of users. In one example, the outlier trimming module 204 trims the outlier data from the group of metric data to generate an adjusted metric data.

The random noise generator 206 generates a random noise value based on a distribution algorithm (e.g., Laplace distribution). Laplace distribution is a continuous probability distribution. It is also referred to as a double exponential distribution because it can be thought of as two exponential distributions (with an additional location parameter) spliced together back-to-back. The difference between two independent identically distributed exponential random variables is governed by a Laplace distribution, as is a Brownian motion evaluated at an exponentially distributed random time. Increments of Laplace motion or a variance gamma process evaluated over the time scale also have a Laplace distribution. The noise distribution module 208 adds the noise value to a corresponding metric value of a metric based on the distribution.

In one example, for each metric with range [0, M], for each user whose true metric value is X, replace X in the database by a noisy value: $X'=X+\xi$, where $\xi$ is a random variable drawn from Laplace distribution $Lap(0, M/\epsilon)$ that has mean zero and scale $M/\epsilon$. M is the maximum value of a metric.

In the solution above $\epsilon$ is a parameter that controls the trade-off between accuracy and privacy. Larger values of $\epsilon$ leads to better accuracy, but weaker privacy guarantees. The present application suggests setting $\epsilon$ in the 5 to 20 range.

After the true values of user metrics are replaced by the noisy ones using the above solution, one can use a conventional interface to the database and allow an analyst to run a number of queries (that will result in consistent responses). The expected absolute value of a sample from the Laplace distribution used in the solution above is $M/\epsilon$.

Laplace distribution returns a value in the range $[-\infty, +\infty]$, although large positive or negative values are unlikely. Therefore, noisy metric values may not belong to the range [0, M]. There are two options here:

1. One can use the noisy metric values as is, without trimming them to the [0, M] range. This may cause an inconvenience as some analysts will likely be surprised to occasionally see a negative metric value. The advantage of this approach is that metric values computed over large sets of employees exhibit lower relative error. In particular, the sum of metric values of t employees will have a total expected error of $\approx\sqrt{t}*M/\epsilon$, due to noise cancellations.
2. One may trim noisy metric value to fit the range [0, M]. This does not affect privacy guarantees. However the reduction in relative error, when computing metric over a large population of employees, may be lower.

The following illustrates another example embodiment operation of the random noise generator 206 and the noise distribution module 208:

Consider an arbitrary metric with a range [0, M]. At the setup phase, an integer s (discretization granularity) is specified. It is assumed that s divides M. The present method suggests setting s large compared to M (e.g., s=M/10), At the setup phase, for each employee Ei the method independently uniformly at random pick a value $\alpha_i \in \{0, \ldots, s-1\}$, that is used to specify the rounding rule.

At the setup phase, for each employee Ei, the method independently invoke the basic algorithm (above solution) to pre-compute and memorize the noisy metric values corresponding to all M/s+1 possible true metric values Xi in the arithmetic progression $$A=\{ls\}_{0 \le l \le M/s}$$

When a new week passes, for each employee Ei, with a true metric value Xi, the following is performed: Assume $X_i \in [L, R)$, where L, R are the two neighboring elements of the arithmetic progression $\{ls\}_{0 \le l \le Ms+1}$. The method rounds Xi to L if $X_i+\alpha_i<R$; otherwise, the method round Xi to R. Let Yi denote the value of Xi after rounding. The databases 130 record the previously computed and memorized value of the noisy metric (for the employee Ei) corresponding to the true metric value Yi.

The solution above combines two ideas. One is that of memorization: if employee's metric has not changed from one week to the other, the employee does not use fresh randomness to generate a new noisy metric value (as doing so would expose him to attacks on privacy that proceed by taking the average of metric values from multiple weeks to cancel out the noise), but instead reuses the previously computed noisy value. Thus, to properly implement memorization the method discretizes the domain of true metric values. Using a naive discretization may lead to a large loss in accuracy, thus instead each employee uses a different discretization rule, which leads to cancellations between rounding errors.

Figure 3:
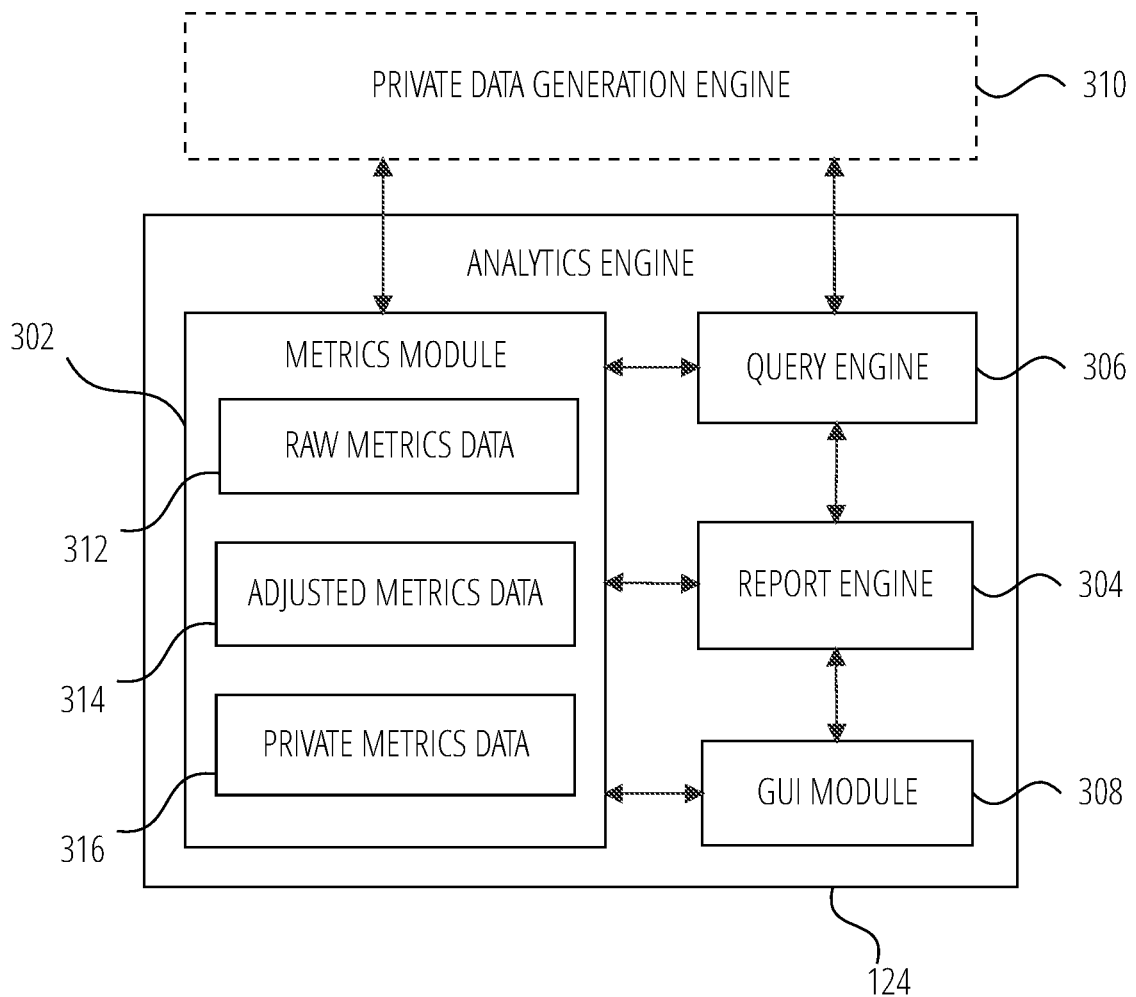
FIG. 3 is a block diagram illustrating an insight platform engine in accordance with one example embodiment.

FIG. 3 is a block diagram illustrating an enterprise performance engine in accordance with one example embodiment. The analytics engine 124 includes a metrics module 302, a report engine 304, a query engine 306, a GUI module 308, a private data generation engine 310, a raw metrics data 312, a private metrics data 316, and an adjusted metrics data 314.

The metrics module 302 communicates with devices of all enterprises having access to the service application 122. In one example embodiment, the metrics module 302 accesses data points (e.g., user operation/interaction data from devices of all enterprises having access to the service application 122). The user operation data indicate user activities with the service application 122 (e.g., when and how often the user is using the service application 122). The user interaction data indicate interactions (e.g., types, frequency, dates, recipients identification) between user accounts of the enterprise using the service application 122.

In another example embodiment, other data points include user activities associated with the enterprise application of the enterprise. Examples of data points include frequency, dates, times of users operating the enterprise application, types of documents being accessed or shared by users of the enterprise application, users calendar data from the enterprise application, communication data between users of the enterprise application, and enterprise organization data. Examples of enterprise applications include email applications, document editing applications, document sharing applications, and other types of applications used by enterprises.

The metrics module 302 computes metrics data based on the data points (e.g., operation/interaction data of the service application 122 from the user accounts associated with the enterprise). Examples of metrics data include after-hours communication metric, collaboration metric. In one example embodiment, the metrics module 302 computes raw metrics data 312 for each user based on the data points. The private data generation engine 310 trims outliers from the raw metrics data 312 to generate adjusted metrics data 314. The private data generation engine 310 adds noise to the adjusted metrics data 314 to generate private metrics data 316.

The query engine 306 performs a query on the metrics module 302. In one example, the query engine 306 performs a query on the private metrics data 316 to preserve privacy and accuracy. An example embodiment of the query engine 306 is described further below with respect to FIG. 4.

The report engine 304 generates a report of the metrics (e.g., aggregate metrics) based on a result of the query engine 306. In another example, the report engine 304 determines that the privacy of the metrics is at risk and caps or denies the answer.

In another example embodiment, the report engine 304 generates a configuration setting (for the service application 122 for the pertinent accounts of the users identified based on the aggregate metrics and kept anonymous to an analyst, a manager requesting the report) based on metrics (e.g., relative operation/interaction metrics of a set of user accounts relative to other user accounts). For example, if the operation/interaction metrics of a set of user accounts is relatively less than the operation/interaction metrics of other user accounts of the enterprise (or below a benchmark index), the report engine 304 provides one or more configuration setting (for the service application 122) on how to increase the operation/interaction metrics. In one example embodiment, the report engine 304 accesses a lookup table based on a user accounts index value of the operation/interaction metrics and identifies a recommended configuration setting based on an index margin threshold between the benchmark index and the user accounts index. The lookup table may specify different types of actions based on the value of the index margin threshold. For example, the different types of actions may vary based on the difference between benchmark index and the user accounts index (e.g., light configuration setting, moderate configuration setting, severe configuration setting).

In one example, the report engine 304 generates a configuration setting that prevents users of the corresponding user accounts from emailing between midnight and 6 am. The report engine 304 configures the service application 122 with the configuration setting.

The GUI module 308 generates a GUI that indicates the operation/interaction metrics (based on the private metrics data 316). The GUI module 308 further identifies a set of anonymous accounts that exhibits anomalous operation/interaction metrics relative to its peer user accounts of the same enterprise or different enterprises. The GUI module 308 defines a portion of the GUI to identify the set of anonymous user accounts. The GUI module 308 enables an administrator to generate a configuration setting for the selected anonymous user accounts.

Figure 4:
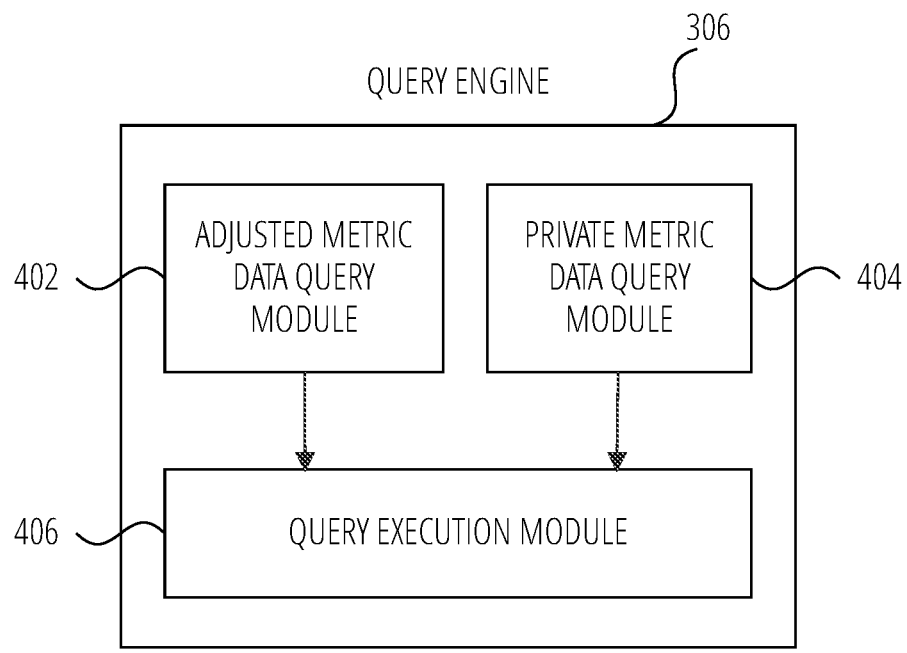
FIG. 4 is a block diagram illustrating a query engine in accordance with one example embodiment.

FIG. 4 is a block diagram illustrating the query engine 306 in accordance with one example embodiment. The query engine 306 comprises an adjusted metric data query module 402, a private metric data query module 404, and a query execution module 406. The query engine 306 performs a query against the adjusted metrics data 314 provided by the adjusted metric data query module 402. The query engine 306 performs a query against the private metrics data 316 provided by the private metric data query module 404.

In one example embodiment, the query execution module 406 compares the results from the adjusted metric data query module 402 with the results from the private metric data query module 404. If the results are within an acceptable preset range (e.g., probability less than 0.01%), the query execution module 406 provides the results based on the private metric data query module 404 to the report engine 304. If the results are outside the acceptable preset range, the query execution module 406 denies displaying results.

In another example embodiment, with unlimited bounded of queries, the query execution module 406 denies displaying result. With limited bounded of queries, the query execution module 406 displays result modified within the 0.1% difference range.

Figure 5:
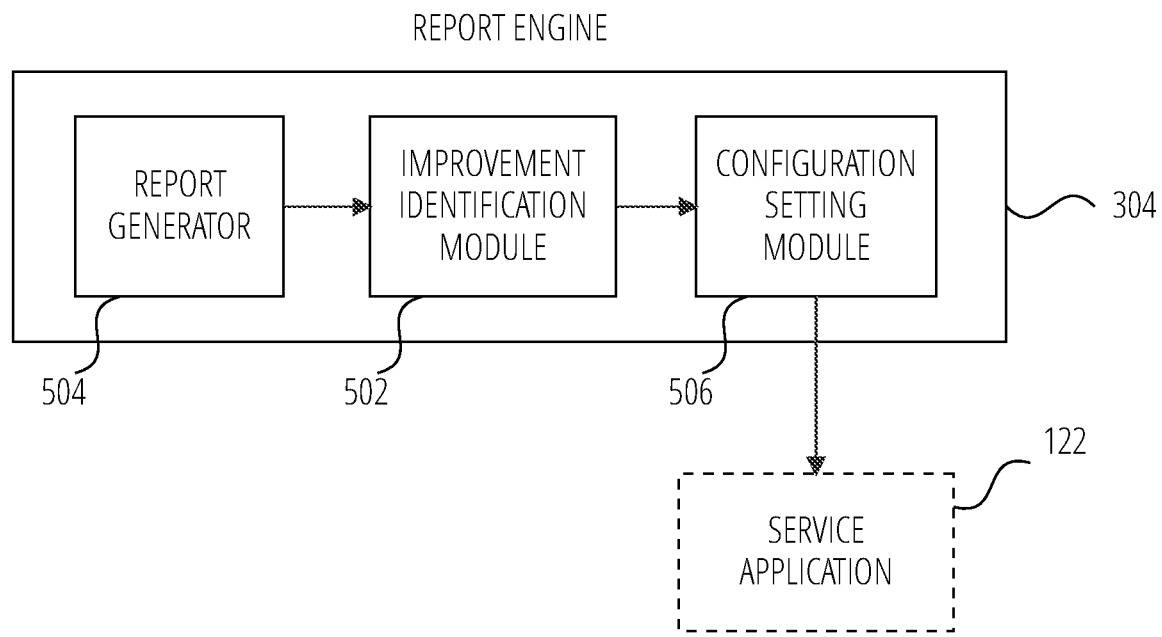
FIG. 5 is a block diagram illustrating a report engine in accordance with one example embodiment.

FIG. 5 illustrates report engine 304 in accordance with one embodiment. The report engine 304 includes a report generator 504, an improvement identification module 502, and a configuration setting module 506. The report generator 504 generates a report of the aggregate metrics of the group of users. The improvement identification module 502 anonymously identifies a set of users with the most potential for improvement. In one example, the improvement identification module 502 anonymously identifies a set of user accounts based on the metrics of the set of user accounts relative to the metrics of peer user accounts. In another example embodiment, the improvement identification module 502 anonymously identifies a set of user accounts based on a selection of user accounts in the GUI generated by the GUI module 308.

The configuration setting module 506 anonymously identifies a set of configuration settings to apply to the service application 122 of the set of user accounts such that the metrics of the set of user accounts improve relative to the metrics of peer user accounts. In one example, the configuration setting module 506 generates operation parameters for the service application 122: the service application 122 may be operated by the set of user accounts between a preset period of time. In another example, the configuration setting module 506 generates notification parameters for the service application 122: the service application 122 generates additional reminders related to the metrics to the set of user accounts (e.g., nudge them to log on after hours, remind them to communicate with supervisor more frequently). The configuration setting module 506 provides the configuration setting to the service application 122. The service application 122 configures itself for the set of user accounts based on the configuration setting from configuration setting module 506.

Figure 6:
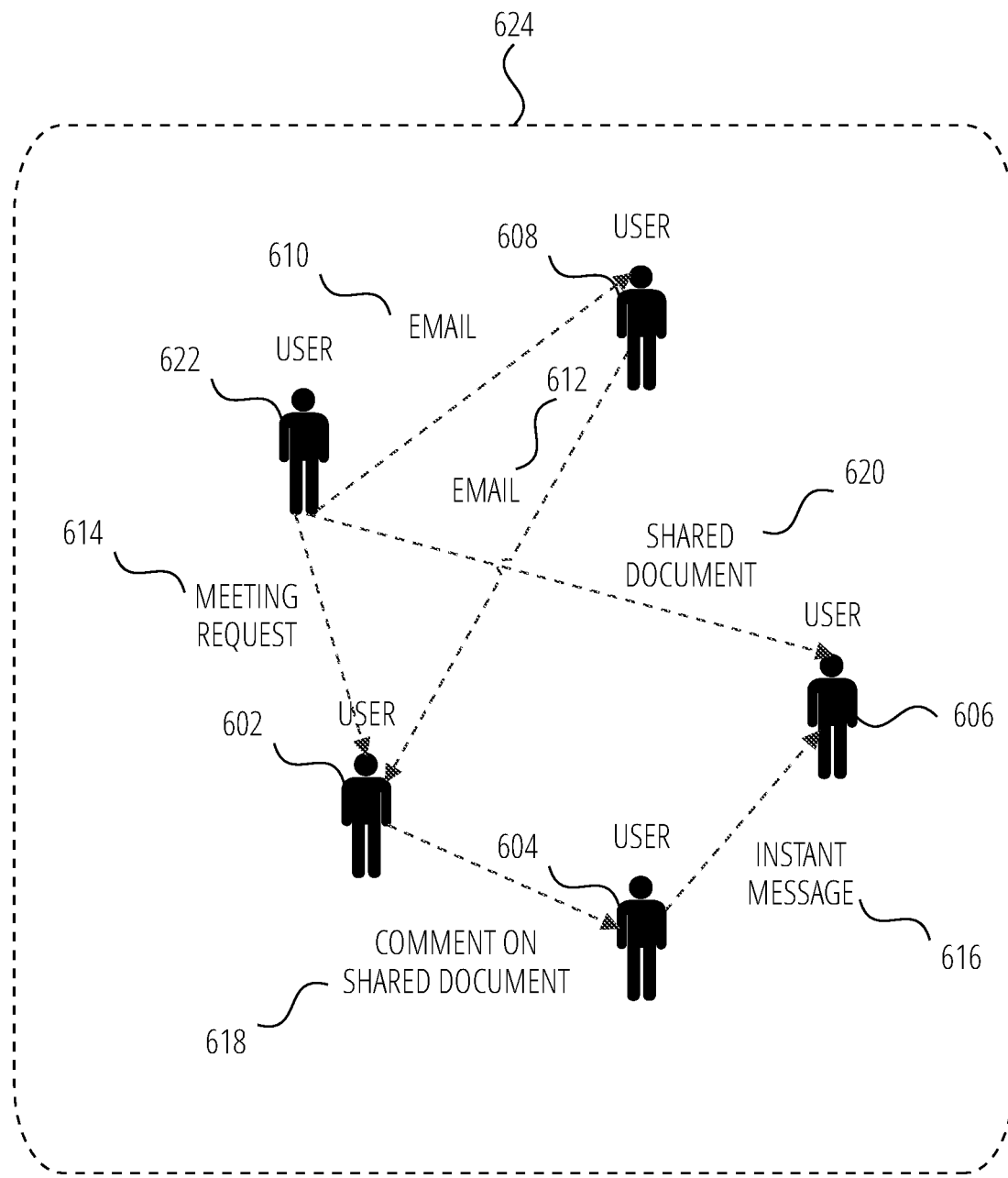
FIG. 6 is a diagrammatic representation of interactions between users of an application in an enterprise setting, in accordance with some example embodiments.

FIG. 6 is a diagrammatic representation of interactions between users in an enterprise, in accordance with some example embodiments. The diagram illustrates peer users (e.g., user 602, user 606, user 608, user 622) that are part of an enterprise 624. The peer users use a respective client device (not shown) using one or more client applications (not shown) to communicate and collaborate with one another.

For example, user 622 sends an email 610 to user 608, sends a shared document 620 to user 606, and sends a meeting request 614 to user 602. The user 608 receives the email 610 from user 622, sends an email 612 to user 602. The user 602 receives the meeting request 614 from user 622, receives the email 612 from user 608, and share a comment on shared document 618 with user 604. The user 604 receives the comment on shared document 618 from metric data interface 202 and sends an instant message 616 to user 606.

In one example embodiment, the analytics engine 124 collects user interaction data representing the interactions between peer users described above. In another example embodiment, the metrics module 302 collects interaction data from a corresponding user of a client device. The analytics engine 124 and the metrics module 302 may collect the interaction data for a preset period of time (e.g., a one-week interval, year to date, or other time frame).

In another example embodiment, the analytics engine 124 collects user interaction data for a user up to a preset degree of contacts. For example, if the preset degree is one, the interaction data for the user 622 includes interaction data for user 608, user 602, and user 606. A core working group of the user 622 would thus include user 608, user 602, and user 606.

Figure 7:
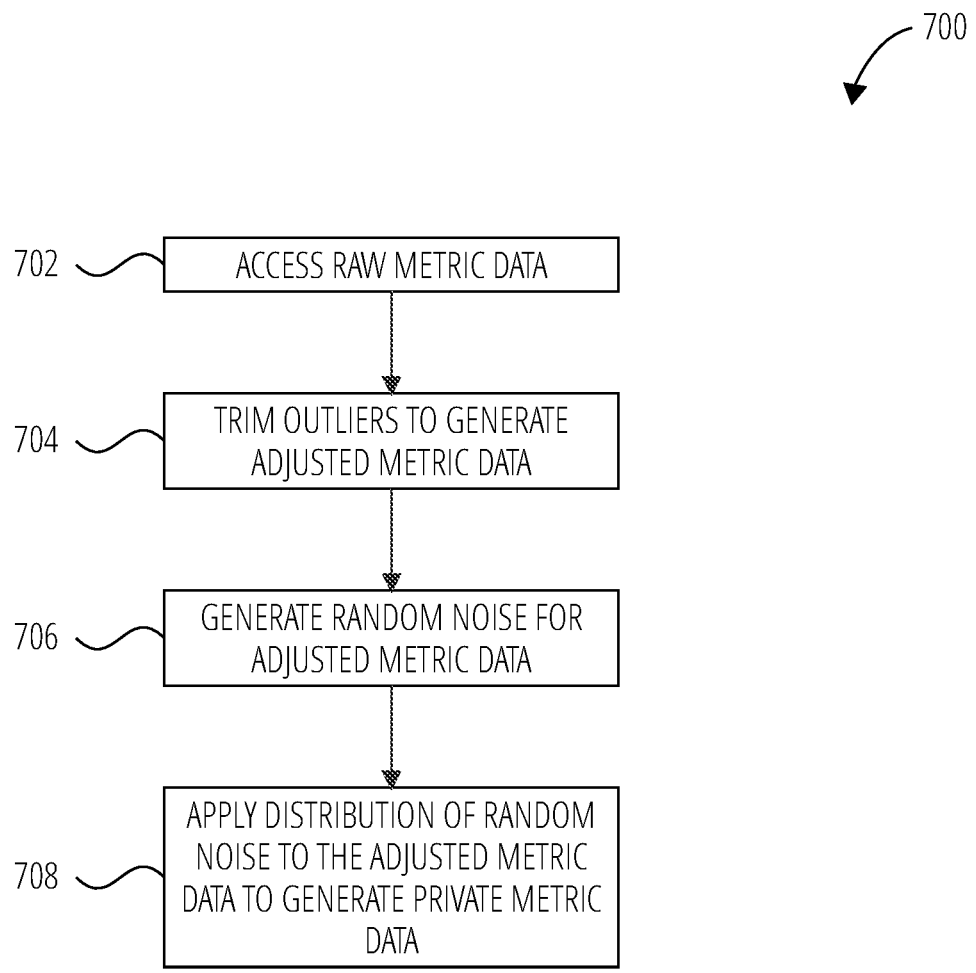
FIG. 7 is a flow diagram illustrating a method for applying a distribution of random noise metric data in accordance with one example embodiment.

FIG. 7 is a flow diagram illustrating a method 700 for generating a recommendation in accordance with one example embodiment. Operations in the method 700 may be performed by the analytics engine 124, using components (e.g., modules, engines) described above with respect to FIG. 3. Accordingly, the method 1000 is described by way of example with reference to the analytics engine 124. However, it shall be appreciated that at least some of the operations of the method 1000 may be deployed on various other hardware configurations or be performed by similar components residing elsewhere. For example, some of the operations may be performed at the client device 106.

At block 702, the private data generation engine 126 accesses raw metric data. At block 704, the private data generation engine 126 optionally trims outliers to generate adjusted metric data. At block 706, the private data generation engine 126 generates random noise for adjusted metric data. For example, the private data generation engine 126 generates for per person per week metric, a corresponding private version (e.g., modified metric value) generated by Laplace distribution algorithm. The sum of aggregated value of certain value is expected error. Thus, the average expected error would be sum/t. At block 708, the private data generation engine 126 applies distribution of random noise to the adjusted metric data to generate private metric data. For example, each metric value is added a corresponding noise value based on the Laplace distribution algorithm.

In another example embodiment, supposing that the focus hour ranges is from [0, 40], the private data generation engine 126, generates, for each person, a discretized array [0, 2, 4, 6, 8, . . . 38, 40] with random value added. For each employee, the private data generation engine 126 applies a rounding rule Ei belongs to {0, 38}. For each week's value Xi, the private data generation engine 126 finds the [L, R]. If Xi+Ei>R, R is chosen else L is chosen.

Figure 8:
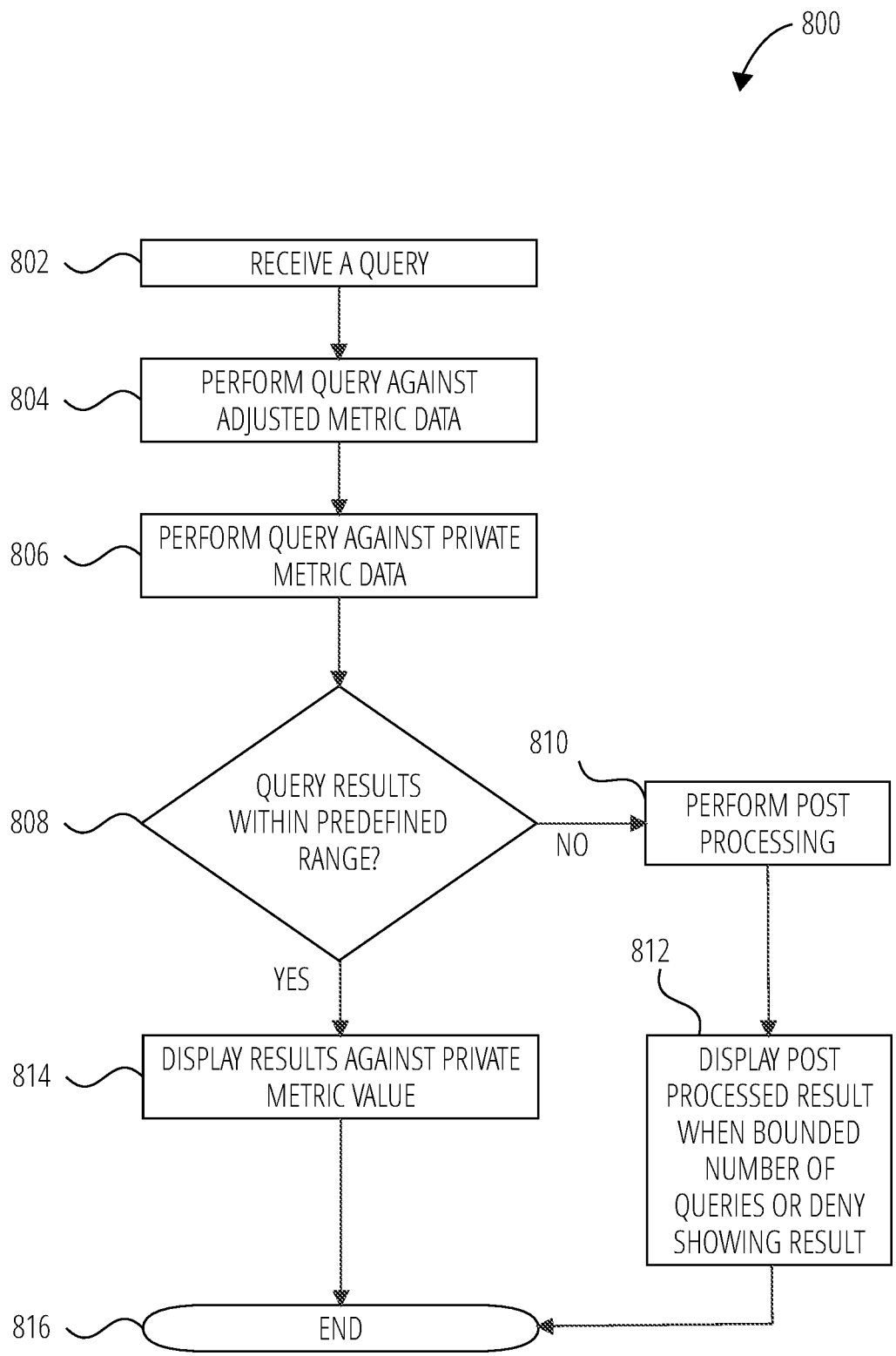
FIG. 8 is a flow diagram illustrating a method for generating a recommendation in accordance with one example embodiment.

FIG. 8 is a flow diagram illustrating a method 800 for generating a recommendation in accordance with one example embodiment. Operations in the method 800 may be performed by the analytics engine 124, using components (e.g., modules, engines) described above with respect to FIG. 3. Accordingly, the method 1000 is described by way of example with reference to the query engine 306. However, it shall be appreciated that at least some of the operations of the method 1000 may be deployed on various other hardware configurations or be performed by similar components residing elsewhere. For example, some of the operations may be performed at the client device 106.

At block 802, the query engine 306 receives a query. At block 804, the query engine 306 performs a query against adjusted metrics data 314. At block 806, the query engine 306 performs a query against private metrics data 316. At decision block 808, the query engine 306 detects whether the query results are within a predefined range. When querying for aggregation values, results coming from the private version (e.g., private metrics data 316)) are compared to results coming from the real values (e.g., raw metrics data 312) and if the derivation is beyond acceptable ranges, a fallback would go for the nearest boundary value (in the case of bounded number of queries). In the case of unlimited number of queries, the query engine 306 denies displaying the results. At block 810, the query engine 306 performs a post processing flow (e.g., cap or rejects the query). At block 812, the query engine 306 displays the post processed result in the case of bounded number of queries denies showing results of the query.

At block 814, in response to detecting that the query results are within the predefined range, the query engine 306 displays the results against the private metrics data 316. The method 800 ends at end block 816.

Figure 9:
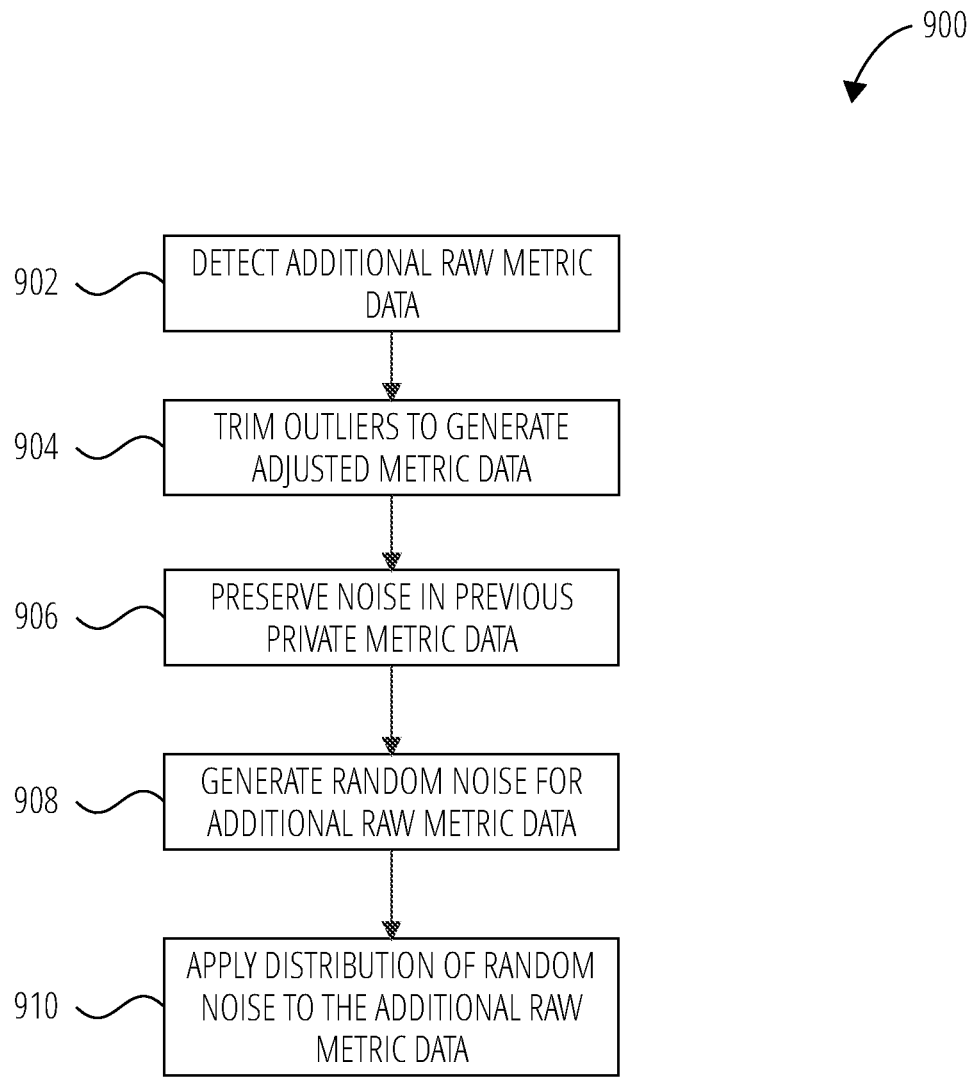
FIG. 9 is a flow diagram illustrating a method for applying random noise to additional raw metric data in accordance with one example embodiment.

FIG. 9 is a flow diagram illustrating a method 900 for generating a recommendation in accordance with one example embodiment. Operations in the method 900 may be performed by the analytics engine 124, using components (e.g., modules, engines) described above with respect to FIG. 3. Accordingly, the method 1000 is described by way of example with reference to the analytics engine 124. However, it shall be appreciated that at least some of the operations of the method 1000 may be deployed on various other hardware configurations or be performed by similar components residing elsewhere. For example, some of the operations may be performed at the client device 106.

At block 902, the private data generation engine 126 detects additional raw metric data (e.g., new data for the last week). At block 904, the private data generation engine 126 trims outliers to generate adjusted metric data. In one example, outliers may be identified using a statistical analysis. At block 906, the private data generation engine 126 preserves (remembers) the noise that was added to previous private metric data. At block 908, the private data generation engine 126 generates random noise for additional raw metric data. At block 910, the private data generation engine 126 applies distribution of random noise to the additional raw metric data.

In one example embodiment, the private data generation engine 126 gets the max value for the metric. For each user and each metric, the private data generation engine 126 computes the discretizing memorized array and random Index and saves the data.

At data load time, the private data generation engine 126 performs the following operations:
1. For each data load, if there is new user, compute the same memorized array and combined with existing one
2. Output new memorized array if any change
3. Compute the corresponding noisy data per person per metric.

The following illustrates an example code representing the above described algorithm:

```
//Construct max value for privacy columns
@newColumnsMax = SELECT DISTINCT 1 AS ConstJoinKey ,
PERCENTILE_DISC(0.99) WITHIN GROUP(ORDER BY TotalFocusHours) OVER( )
AS Percentile99TotalFocusHours,
PERCENTILE_DISC(0.95) WITHIN GROUP(ORDER BY TotalFocusHours) OVER( )
AS Percentile95TotalFocusHours,
PERCENTILE_DISC(0.99) WITHIN GROUP(ORDER BY
AfterHoursCollaboration) OVER( ) AS
Percentile99AfterHoursCollaboration,
PERCENTILE_DISC(0.95) WITHIN GROUP(ORDER BY
AfterHoursCollaboration) OVER( ) AS
Percentile95AfterHoursCollaboration
   FROM @result;
```

```
@newColumnsMax = SELECT ConstJoinKey ,
o365OrgAnalytics.Usql.Utility.DifferentialPrivacyUtility.GetMaxValu
e(50, (double)Percentile99TotalFocusHours,
(double)Percentile95TotalFocusHours) AS MaxTotalFocusHours,
o365OrgAnalytics.Usql.Utility.DifferentialPrivacyUtility.GetMaxValu
e(20, (double)Percentile99AfterHoursCollaboration,
(double)Percentile95AfterHoursCollaboration) AS
MaxAfterHoursCollaboration
        FROM @newColumnsMax;
@existingColumnsMax = SELECT *
                      FROM (VALUES(1 ))
                      AS D(ConstJoinKey );
@max = SELECT L.ConstJoinKey
            , R.MaxTotalFocusHours, R.MaxAfterHoursCollaboration
        FROM @existingColumnsMax AS L JOIN @newColumnsMax AS R ON
L.ConstJoinKey == R.ConstJoinKey;
@result = SELECT 1 AS ConstJoinKey, * FROM @result;
@result = SELECT L.*, R.MaxTotalFocusHours,
R.MaxAfterHoursCollaboration
            FROM @result AS L JOIN @max AS R ON L.ConstJoinKey ==
R.ConstJoinKey;
//generating new noise columns
@result = SELECT *,
o365OrgAnalytics.Usql.Utility.DifferentialPrivacyUtility.LaplaceDis
tributionSample(0, MaxTotalFocusHours, 20) AS NoiseTotalFocusHours,
o365OrgAnalytics.Usql.Utility.DifferentialPrivacyUtility.LaplaceDis
tributionSample(0, MaxAfterHoursCollaboration, 20) AS
NoiseAfterHoursCollaboration
            FROM @result;
@result = SELECT *,
o365OrgAnalytics.Usql.Utility.DifferentialPrivacyUtility.CapValue(T
otalFocusHours, MaxTotalFocusHours) AS AdjustedTotalFocusHours,
o365OrgAnalytics.Usql.Utility.DifferentialPrivacyUtility.CapValue(A
fterHoursCollaboration, MaxAfterHoursCollaboration) AS
AdjustedAfterHoursCollaboration
            FROM @result;
//Select Noise data and save for later usage
@noiseData = SELECT PersonId, MetricDate, NoiseTotalFocusHours,
NoiseAfterHoursCollaboration
            FROM @result;
@result = SELECT *,
AdjustedTotalFocusHours + NoiseTotalFocusHours AS
PrivateTotalFocusHours,
AdjustedAfterHoursCollaboration + NoiseAfterHoursCollaboration AS
PrivateAfterHoursCollaboration
FROM @result;
```

Figure 10:
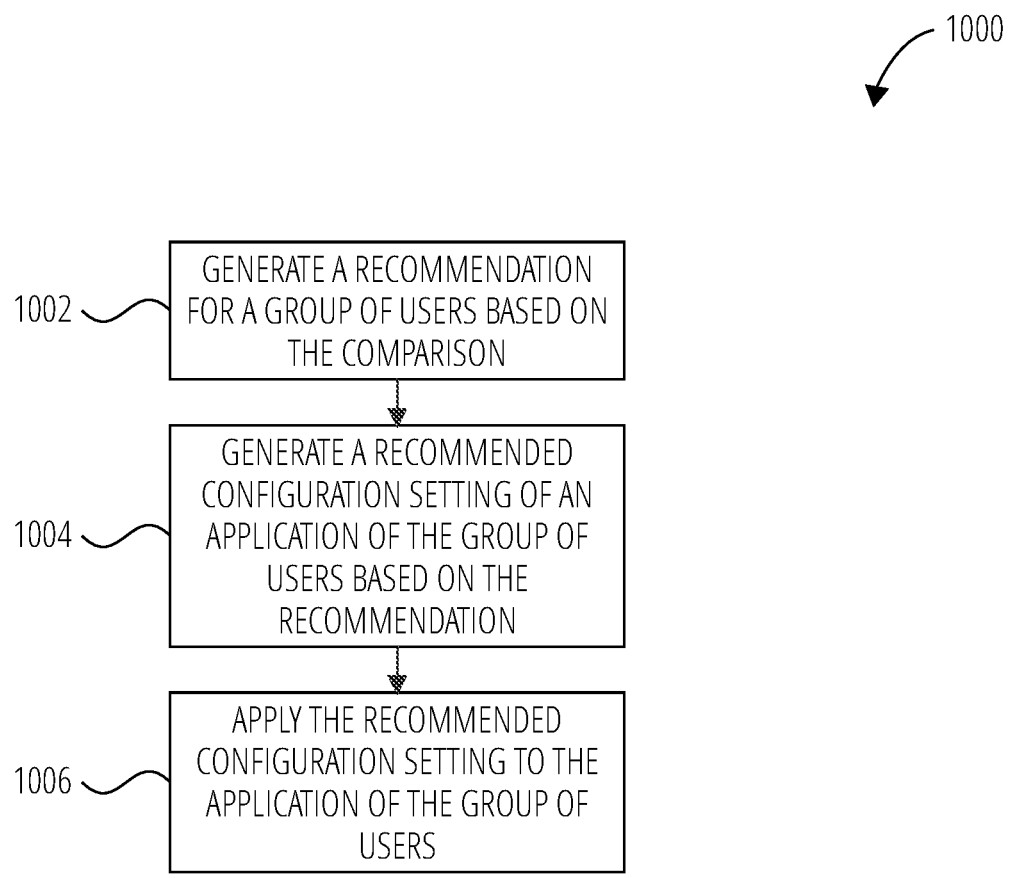
FIG. 10 is a flow diagram illustrating a method for applying a recommended configuration setting in accordance with one example embodiment.

FIG. 10 is a flow diagram illustrating a method 1000 for applying the recommended configuration setting in accordance with one example embodiment. Operations in the method 1000 may be performed by the analytics engine 124, using components (e.g., modules, engines) described above with respect to FIG. 3. Accordingly, the method 1000 is described by way of example with reference to the analytics engine 124. However, it shall be appreciated that at least some of the operations of the method 1000 may be deployed on various other hardware configurations or be performed by similar components residing elsewhere. For example, some of the operations may be performed at the client device 106.

At block 1002, the report engine 304 generates a recommendation for a group of users based on the comparison. At block 1004, the report engine 304 generates a recommended configuration setting of the service application 122 of the group of users based on the recommendation. At block 1006, the report engine 304 applies the recommended configuration setting to the service application 122 of the group of users.

Figure 11:
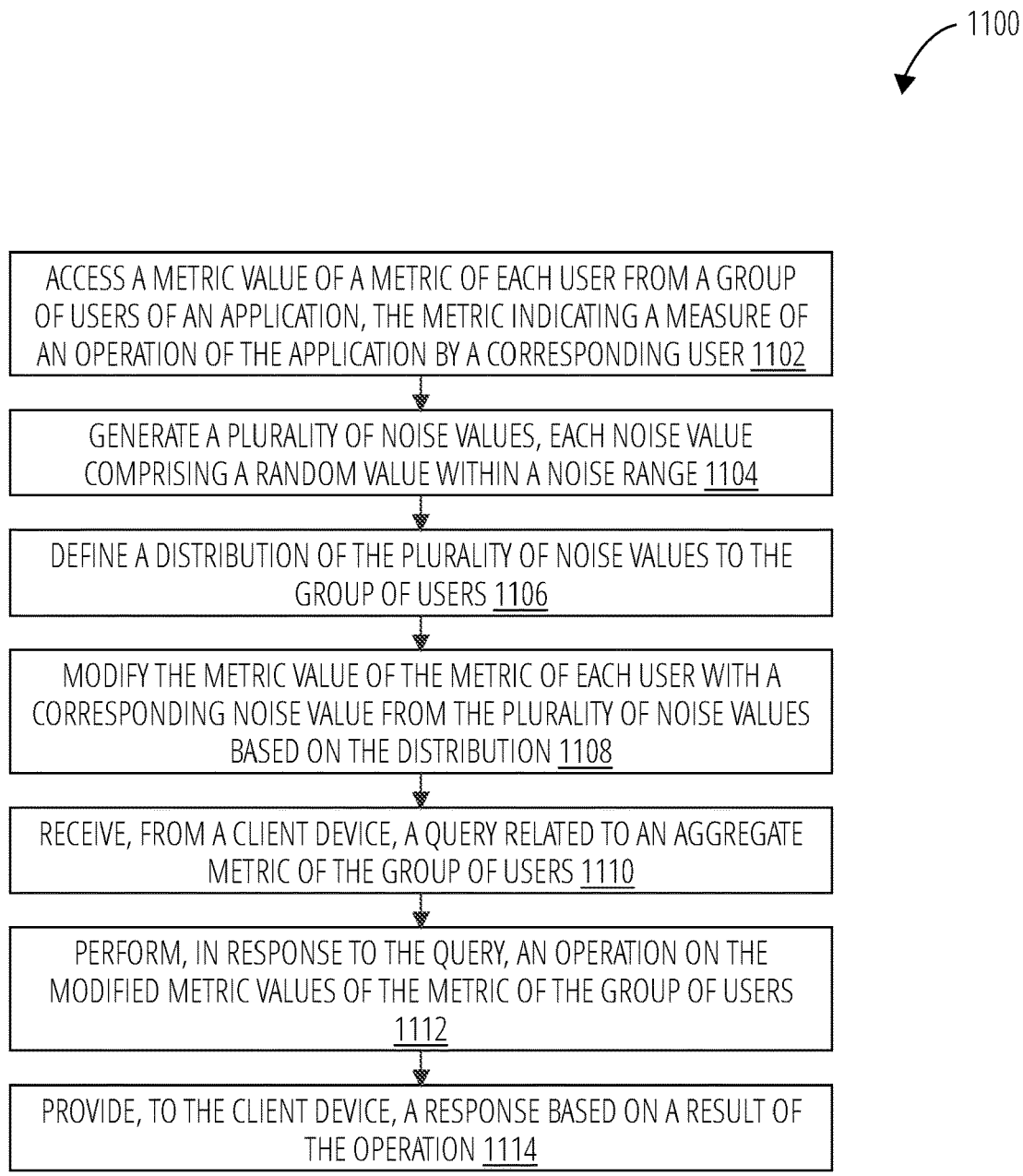
FIG. 11 illustrates a routine in accordance with one example embodiment.

FIG. 11 illustrates a routine in accordance with one example embodiment. In block 1102, routine 1100 accesses a metric value of a metric of each user from a group of users of an application, the metric indicating a measure of an operation of the application by a corresponding user. In block 1104, routine 1100 generates a plurality of noise values, each noise value comprising a random value within a noise range. In block 1106, routine 1100 defines a distribution of the plurality of noise values to the group of users. In block 1108, routine 1100 modifies the metric value of the metric of each user with a corresponding noise value from the plurality of noise values based on the distribution. In block 1110, routine 1100 receives, from a client device, a query related to an aggregate metric of the group of users. In block 1112, routine 1100 performs, in response to the query, an operation on the modified metric values of the metric of the group of users. In block 1114, routine 1100 provides, to the client device, a response based on a result of the operation.

Figure 12:
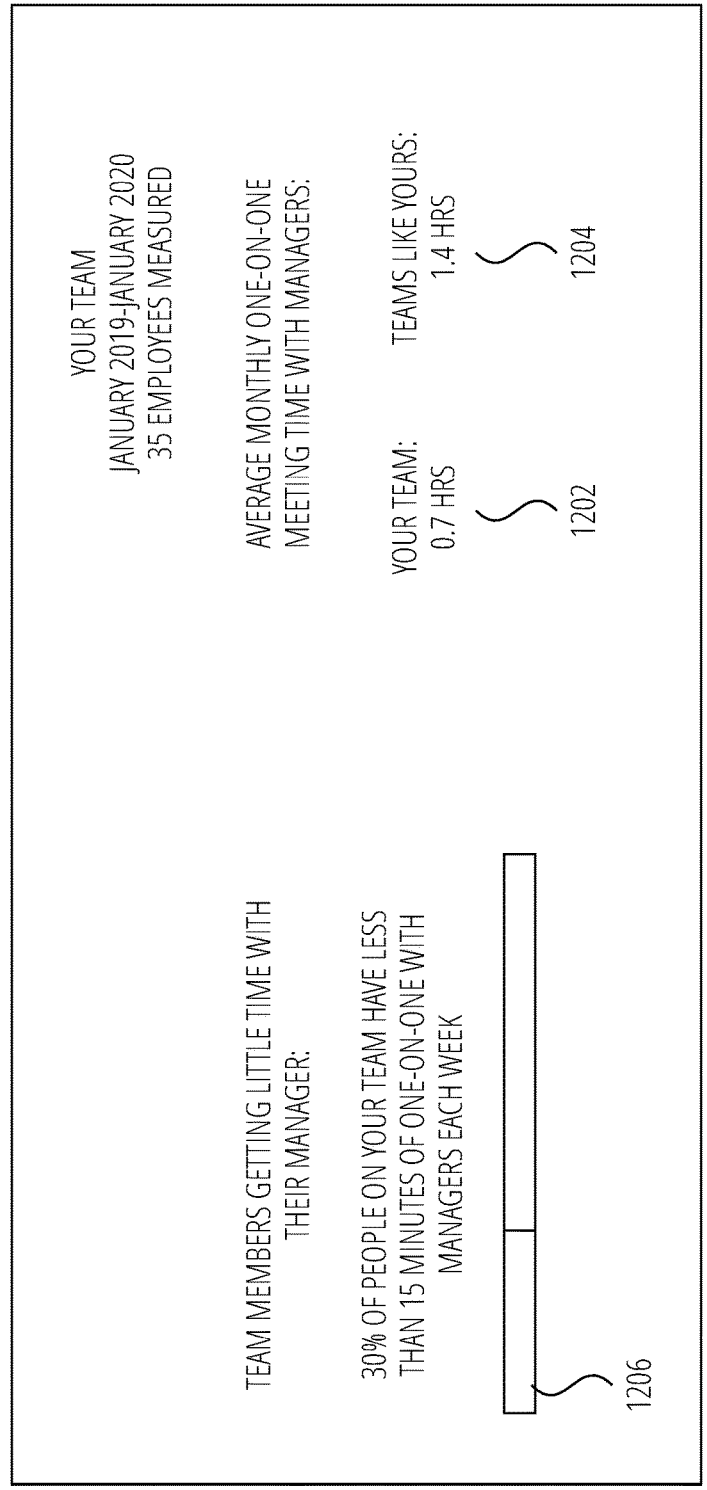
FIG. 12 illustrates an example of a graphical user interface in accordance with one example embodiment.

FIG. 12 illustrates an example of a graphical user interface 1200 in accordance with one example embodiment. The graphical user interface 1200 illustrates a presentation of results from a query of metrics related to a set of user accounts of the enterprise. The element 1202 illustrates metrics (e.g., average monthly meeting time with managers) related to activities of users accounts of a team in an enterprise. The element 1204 illustrates metrics related to activities of users accounts from other teams in the same enterprise.

The graphical user interface 1200 includes a bar graph 1206 that illustrates another metric (e.g., % of people on a team having less than 15 minutes of 1:1 meeting with a manager each week).

Figure 13:
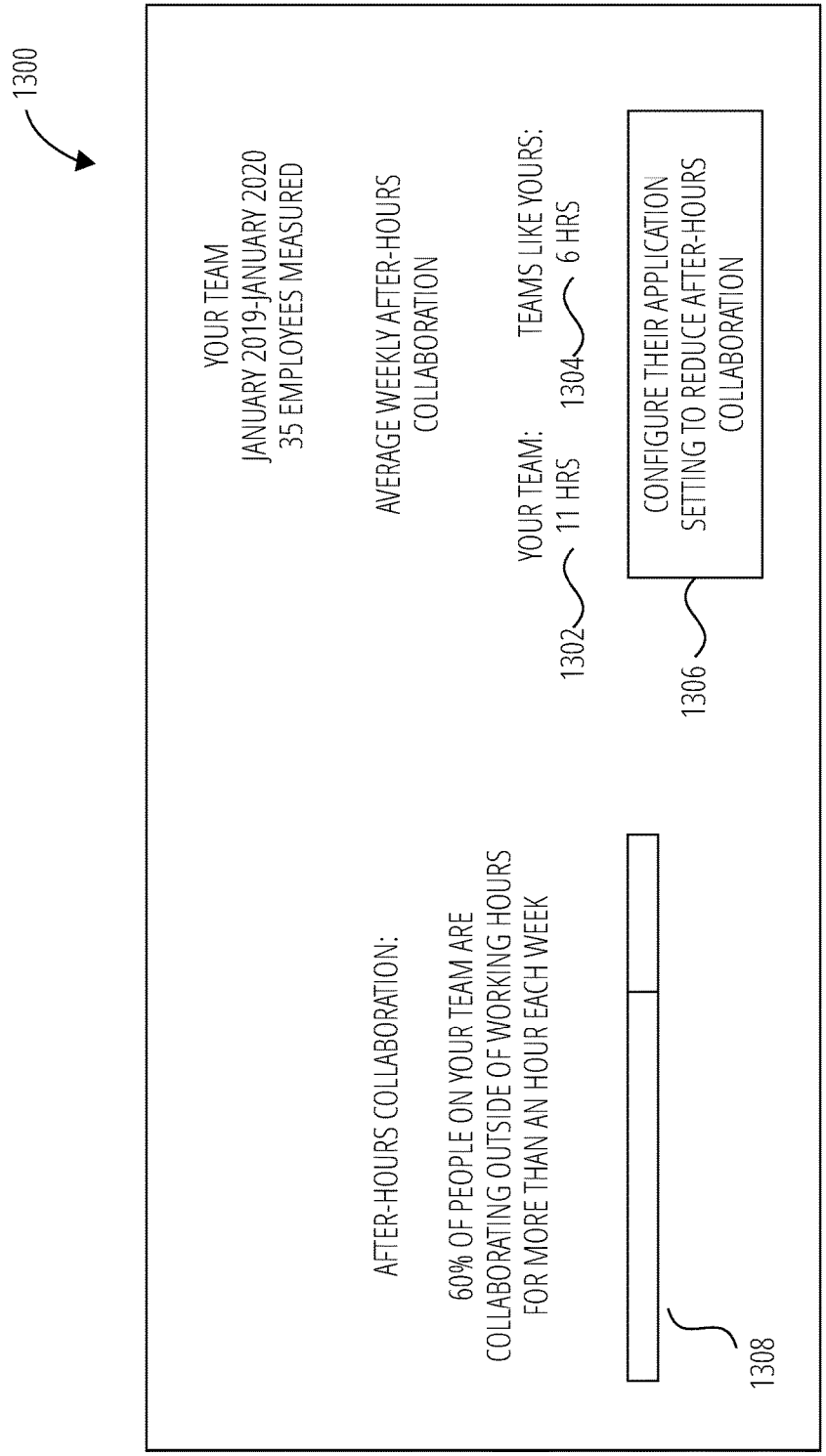
FIG. 13 illustrates an example of a graphical user interface in accordance with one example embodiment.

FIG. 13 illustrates an example of a graphical user interface 1300 in accordance with one example embodiment. The graphical user interface 1300 illustrates a presentation of results from a query of metrics related to a set of user accounts of the enterprise. The element 1302 illustrates metrics (e.g., average weekly after-hours collaboration) related to activities of users accounts of a team in an enterprise. The element 1304 illustrates metrics related to activities of users accounts from other teams in the same enterprise.

The graphical user interface 1300 includes a bar graph 1308 that illustrates another metric (e.g., % of people on a team collaborating outside working hours for more than one hour each week).

The graphical user interface 1300 also enables the manager of the team to configure the application setting of the team members by clicking on the configuration setting interface element 1306. The configuration setting interface element 1306 triggers a configuration setting of the service application 122 (for an account of each team member) based on the results of the metrics (e.g., element 1302). For example, the analytics engine 124 generates a request to the service application 122. The request may be for example, to activate a "do-not-disturb" setting on the service application 122 for the account of the team members (who have collaborated outside working hours for more than one hour each week). It is noted that the identity of the teams members corresponding to the metrics (e.g., % of people on a team collaborating outside working hours for more than one hour each week) is anonymous to the manager. With the "do-not-disturb" setting turned on, the team member is likely to collaborate less outside working hours. In another example, the request includes a request to activate a reminder setting on the service application 122 for the account of the team members (who have collaborated outside working hours for more than one hour each week). As such, when a team members logs into the service application 122 after working hours, he or she will receive a reminder to reduce after-hours collaboration activities (e.g., reduce email activities).

Figure 14:
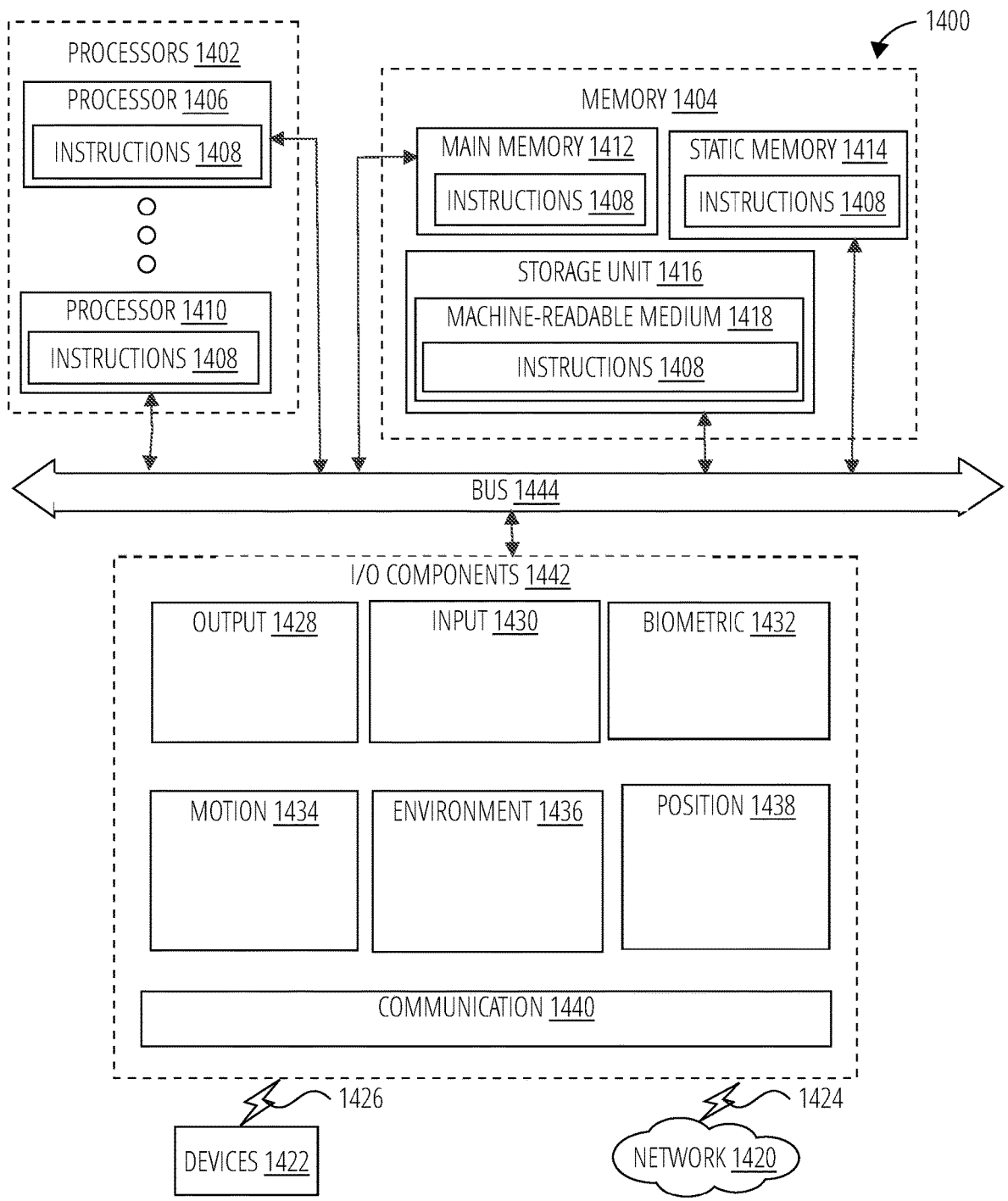
FIG. 14 is a diagrammatic representation of a machine in the form of a computer system within which a set of instructions may be executed for causing the machine to perform any one or more of the methodologies discussed herein, according to an example embodiment.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include processors 1402, memory 1404, and I/O components 1442, which may be configured to communicate with each other via a bus 1444. In an example embodiment, the processors 1402 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1406 and a Processor 1410 that execute the instructions 1408. The term "Processor" is intended to include multi-core processors that may comprise two or more independent processors (sometimes referred to as "cores") that may execute instructions contemporaneously. Although FIG. 14 shows multiple processors 1402, the machine 1400 may include a single Processor with a single core, a single Processor with multiple cores (e.g., a multi-core Processor), multiple processors with a single core, multiple processors with multiples cores, or any combination thereof.

The memory 1404 includes a main memory 1412, a static memory 1414, and a storage unit 1416, both accessible to the processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the Processor's cache memory), or any suitable combination thereof, during execution thereof by the machine 1400.

The I/O components 1442 may include a wide variety of components to receive input, provide output, produce output, transmit information, exchange information, capture measurements, and so on. The specific I/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other components that are not shown in FIG. 14. In various example embodiments, the I/O components 1442 may include output components 1428 and input components 1430. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1430 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1442 may include biometric components 1432, motion components 1434, environmental components 1436, or position components 1438, among a wide array of other components. For example, the biometric components 1432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 include acceleration sensor components (e.g., accelerometer), gravitation sensor components, rotation sensor components (e.g., gyroscope), and so forth. The environmental components 1436 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1442 further include communication components 1440 operable to couple the machine 1400 to a network 1420 or devices 1422 via a coupling 1424 and a coupling 1426, respectively. For example, the communication components 1440 may include a network interface Component or another suitable device to interface with the network 1420. In further examples, the communication components 1440 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1422 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface Component included in the communication components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: accessing a metric value of a metric of each user from a group of users of an application, the metric indicating a measure of an operation of the application by a corresponding user; generating a plurality of noise values, each noise value comprising a random value within a noise range, the noise range comprising a range of the metric values from the group of users; defining a distribution of the plurality of noise values to the group of users; modifying the metric value of the metric of each user with a corresponding noise value from the plurality of noise values based on the distribution; receiving, from a client device, a query related to an aggregate metric of the group of users; performing, in response to the query, an operation on the modified metric values of the metric of the group of users; and providing, to the client device, a response based on a result of the operation.

Example 2 includes example 1, further comprising: performing the operation on the metric values of the metric of the group of users; comparing a result from the operation on the metric values with the result from the operation on the modified metric values; calculating a margin of error based on the comparison; determining that the margin of error is within an error threshold; and in response to determining that the margin of error is within the error threshold, providing, in the response, a result of the operation on the modified metric values.

Example 3 includes any of the above examples, further comprising: performing the operation on the metric values of the metric of the group of users; comparing a result from the operation on the metric values with the result from the operation on the modified metric values; calculating a margin of error based on the comparison; determining that the margin of error exceeds an error threshold; identifying a query configuration setting, the query configuration setting identifying a unbounded number of queries or a bounded number of queries; and in response to determining that the margin of error exceeds an error threshold, providing, in the response, a rejection notification for the query configuration setting identifying the unbounded number of queries or an adjusted result for the query configuration setting identifying the bounded number of queries, the adjusted result including a modification to the result from the operation on the modified metric values, the modification being within the error threshold.

Example 4 includes any of the above examples, wherein the margin of error is based on a difference between the modified metric values over the noise values and the modified metric values over the metric values.

Example 5 includes any of the above examples, wherein defining the distribution further comprises: assigning a noise value from the plurality of noise values to a user from the group of users, and wherein modifying the metric value of the metric of each user further comprises: adding or subtracting the noise value assigned to the user to the metric value of the corresponding user to generate the modified metric value for the corresponding user.

Example 6 includes any of the above examples, wherein defining the distribution further comprises: defining a maximum value of the metric value for the metric of the group of users; identifying an outlier value of a first metric of a first user, the outlier value exceeding the maximum value; adjusting the outlier value to the maximum value; and applying a noise value from the plurality of noise values to the adjusted outlier value based on the distribution.

Example 7 includes any of the above examples, wherein generating the plurality of noise values further comprises: computing an aggregate noise value from the plurality of noise values; and minimizing the aggregate noise value corresponding to the aggregate metric.

Example 8 includes any of the above examples, further comprising: accessing an updated metric value of the metric of a first user of the group of users; generating an additional noise value corresponding to the updated metric value; defining an updated distribution of the additional noise value and plurality of noise values to the group of users; modifying the metric value of the metric of the first user with the additional noise value based on the updated distribution; receiving, from the client device, a second query related to the aggregate metric of the group of users; performing, in response to the second query, a second operation on the modified metric values of the metric of the first user and the group of users; and providing, to the client device, a second response based on a result of the second operation.

Example 9 includes any of the above examples, wherein the aggregate metric comprises at least one of an average after-hours metric or an average collaboration hours metric, the after-hours metric measuring the operation of the application outside a time range, the collaboration hours metric measuring a frequency and duration of communications among users of the application, wherein the application comprises a communication application or a calendar application.

Example 10 includes any of the above examples, wherein the query identifies an enterprise attribute of a user profile from the group of users.

Example 11 is a computing apparatus comprising: a processor; and a memory storing instructions that, when executed by the processor, configure the apparatus to: access a metric value of a metric of each user from a group of users of an application, the metric indicating a measure of an operation of the application by a corresponding user; generate a plurality of noise values, each noise value comprising a random value within a noise range, the noise range comprising a range of the metric values from the group of users; define a distribution of the plurality of noise values to the group of users; modify the metric value of the metric of each user with a corresponding noise value from the plurality of noise values based on the distribution; receive, from a client device, a query related to an aggregate metric of the group of users; perform, in response to the query, an operation on the modified metric values of the metric of the group of users; and provide, to the client device, a response based on a result of the operation.

Example 12 includes any of the above examples, wherein the instructions further configure the apparatus to: perform the operation on the metric values of the metric of the group of users; compare a result from the operation on the metric values with the result from the operation on the modified metric values; calculate a margin of error based on the comparison; determine that the margin of error is within an error threshold; and in response to determining that the margin of error is within the error threshold, provide, in the response, a result of the operation on the modified metric values.

Example 13 includes any of the above examples, wherein the instructions further configure the apparatus to: perform the operation on the metric values of the metric of the group of users; compare a result from the operation on the metric values with the result from the operation on the modified metric values; calculate a margin of error based on the comparison; determine that the margin of error exceeds an error threshold; identify a query configuration setting, the query configuration setting identifying a unbounded number of queries or a bounded number of queries; and in response to determining that the margin of error exceeds an error threshold, provide, in the response, a rejection notification for the query configuration setting identifying the unbounded number of queries or an adjusted result for the query configuration setting identifying the bounded number of queries, the adjusted result including a modification to the result from the operation on the modified metric values, the modification being within the error threshold.

Example 14 includes any of the above examples, wherein the margin of error is based on a difference between the modified metric values over the noise values and the modified metric values over the metric values.

Example 15 includes any of the above examples, wherein defining the distribution further comprises: assign a noise value from the plurality of noise values to a user from the group of users, and wherein modifying the metric value of the metric of each user further comprises: add or subtract the noise value assigned to the user to the metric value of the corresponding user to generate the modified metric value for the corresponding user.

Example 16 includes any of the above examples, wherein defining the distribution further comprises: define a maximum value of the metric value for the metric of the group of users; identify an outlier value of a first metric of a first user, the outlier value exceeding the maximum value; adjust the outlier value to the maximum value; and apply a noise value from the plurality of noise values to the adjusted outlier value based on the distribution.

Example 17 includes any of the above examples, wherein generating the plurality of noise values further comprises: compute an aggregate noise value from the plurality of noise values; and minimize the aggregate noise value corresponding to the aggregate metric.

Example 18 includes any of the above examples, wherein the instructions further configure the apparatus to: access an updated metric value of the metric of a first user of the group of users; generate an additional noise value corresponding to the updated metric value; define an updated distribution of the additional noise value and plurality of noise values to the group of users; modify the metric value of the metric of the first user with the additional noise value based on the updated distribution; receive, from the client device, a second query related to the aggregate metric of the group of users; perform, in response to the second query, a second operation on the modified metric values of the metric of the first user and the group of users; and provide, to the client device, a second response based on a result of the second operation.

Example 19 includes any of the above examples, wherein the aggregate metric comprises at least one of an average after-hours metric or an average collaboration hours metric, wherein the aggregate metric comprises at least one of an average after-hours metric or an average collaboration hours metric, the after-hours metric measuring the operation of the application outside a time range, the collaboration hours metric measuring a frequency and duration of communications among users of the application, wherein the application comprises a communication application or a calendar application.

Example 20 is a computer-readable storage medium, the computer-readable storage medium including instructions that when executed by a computer, cause the computer to perform operations comprising: access a metric value of a metric of each user from a group of users of an application, the metric indicating a measure of an operation of the application by a corresponding user; generate a plurality of noise values, each noise value comprising a random value within a noise range, the noise range comprising a range of the metric values from the group of users; define a distribution of the plurality of noise values to the group of users; modify the metric value of the metric of each user with a corresponding noise value from the plurality of noise values based on the distribution; receive, from a client device, a query related to an aggregate metric of the group of users; perform, in response to the query, an operation on the modified metric values of the metric of the group of users; and provide, to the client device, a response based on a result of the operation.

What is claimed is:

1. A computer-implemented method comprising:
accessing a metric value of a metric of each user from a group of users of an application, the metric indicating a measure of an operation of the application by a corresponding user;
generating a plurality of noise values, each noise value comprising a random value within a noise range, the noise range comprising a range of the metric values from the group of users;
defining a distribution of the plurality of noise values to the group of users;
modifying the metric value of the metric of each user with a corresponding noise value from the plurality of noise values based on the distribution;
receiving, from a client device, a query related to an aggregate metric of the group of users;
performing, in response to the query, an operation on the modified metric values of the metric of the group of users; and
providing, to the client device, a response based on a result of the operation.

2. The computer-implemented method of claim 1, further comprising:
performing the operation on the metric values of the metric of the group of users;
comparing a result from the operation on the metric values with the result from the operation on the modified metric values;
calculating a margin of error based on the comparison;
determining that the margin of error is within an error threshold; and
in response to determining that the margin of error is within the error threshold, providing, in the response, a result of the operation on the modified metric values.

3. The computer-implemented method of claim 2, wherein the margin of error is based on a difference between the modified metric values over the noise values and the modified metric values over the metric values.

4. The computer-implemented method of claim 1, further comprising:
performing the operation on the metric values of the metric of the group of users;
comparing a result from the operation on the metric values with the result from the operation on the modified metric values;
calculating a margin of error based on the comparison;
determining that the margin of error exceeds an error threshold;
identifying a query configuration setting, the query configuration setting identifying a unbounded number of queries or a bounded number of queries; and
in response to determining that the margin of error exceeds an error threshold, providing, in the response, a rejection notification for the query configuration setting identifying the unbounded number of queries or an adjusted result for the query configuration setting identifying the bounded number of queries, the adjusted result including a modification to the result from the operation on the modified metric values, the modification being within the error threshold.

5. The computer-implemented method of claim 1, wherein defining the distribution further comprises:
assigning a noise value from the plurality of noise values to a user from the group of users, and
wherein modifying the metric value of the metric of each user further comprises:
adding or subtracting the noise value assigned to the user to the metric value of the corresponding user to generate the modified metric value for the corresponding user.

6. The computer-implemented method of claim 1, wherein defining the distribution further comprises:
defining a maximum value of the metric value for the metric of the group of users;
identifying an outlier value of a first metric of a first user, the outlier value exceeding the maximum value;
adjusting the outlier value to the maximum value; and
applying a noise value from the plurality of noise values to the adjusted outlier value based on the distribution.

7. The computer-implemented method of claim 1, wherein generating the plurality of noise values further comprises:
computing an aggregate noise value from the plurality of noise values; and
minimizing the aggregate noise value corresponding to the aggregate metric.

8. The computer-implemented method of claim 1, further comprising:
accessing an updated metric value of the metric of a first user of the group of users;
generating an additional noise value corresponding to the updated metric value;
defining an updated distribution of the additional noise value and plurality of noise values to the group of users;
modifying the metric value of the metric of the first user with the additional noise value based on the updated distribution;
receiving, from the client device, a second query related to the aggregate metric of the group of users;
performing, in response to the second query, a second operation on the modified metric values of the metric of the first user and the group of users; and
providing, to the client device, a second response based on a result of the second operation.

9. The computer-implemented method of claim 1, wherein the aggregate metric comprises at least one of an average after-hours metric or an average collaboration hours metric, the after-hours metric measuring the operation of the application outside a time range, the collaboration hours metric measuring a frequency and duration of communications among users of the application, wherein the application comprises a communication application or a calendar application.

10. The computer-implemented method of claim 1, wherein the query identifies an enterprise attribute of a user profile from the group of users.

11. A computing apparatus, the computing apparatus comprising:
a processor; and
a memory storing instructions that, when executed by the processor, configure the apparatus to:
access a metric value of a metric of each user from a group of users of an application, the metric indicating a measure of an operation of the application by a corresponding user;
generate a plurality of noise values, each noise value comprising a random value within a noise range, the noise range comprising a range of the metric values from the group of users;
define a distribution of the plurality of noise values to the group of users;
modify the metric value of the metric of each user with a corresponding noise value from the plurality of noise values based on the distribution;
receive, from a client device, a query related to an aggregate metric of the group of users;
perform, in response to the query, an operation on the modified metric values of the metric of the group of users; and
provide, to the client device, a response based on a result of the operation.

12. The computing apparatus of claim 11, wherein the instructions further configure the apparatus to:
perform the operation on the metric values of the metric of the group of users;
compare a result from the operation on the metric values with the result from the operation on the modified metric values;
calculate a margin of error based on the comparison;
determine that the margin of error is within an error threshold; and
in response to determining that the margin of error is within the error threshold, provide, in the response, a result of the operation on the modified metric values.

13. The computing apparatus of claim 12, wherein the margin of error is based on a difference between the modified metric values over the noise values and the modified metric values over the metric values.

14. The computing apparatus of claim 11, wherein the instructions further configure the apparatus to:
perform the operation on the metric values of the metric of the group of users;
compare a result from the operation on the metric values with the result from the operation on the modified metric values;
calculate a margin of error based on the comparison;
determine that the margin of error exceeds an error threshold;
identify a query configuration setting, the query configuration setting identifying a unbounded number of queries or a bounded number of queries; and
in response to determining that the margin of error exceeds an error threshold, provide, in the response, a rejection notification for the query configuration setting identifying the unbounded number of queries or an adjusted result for the query configuration setting identifying the bounded number of queries, the adjusted result including a modification to the result from the operation on the modified metric values, the modification being within the error threshold.

15. The computing apparatus of claim 11, wherein defining the distribution further comprises:
assign a noise value from the plurality of noise values to a user from the group of users, and
wherein modifying the metric value of the metric of each user further comprises:
add or subtract the noise value assigned to the user to the metric value of the corresponding user to generate the modified metric value for the corresponding user.

16. The computing apparatus of claim 11, wherein defining the distribution further comprises:
define a maximum value of the metric value for the metric of the group of users;
identify an outlier value of a first metric of a first user, the outlier value exceeding the maximum value;
adjust the outlier value to the maximum value; and
apply a noise value from the plurality of noise values to the adjusted outlier value based on the distribution.

17. The computing apparatus of claim 11, wherein generating the plurality of noise values further comprises:
compute an aggregate noise value from the plurality of noise values; and
minimize the aggregate noise value corresponding to the aggregate metric.

18. The computing apparatus of claim 11, wherein the instructions further configure the apparatus to:
access an updated metric value of the metric of a first user of the group of users;
generate an additional noise value corresponding to the updated metric value;
define an updated distribution of the additional noise value and plurality of noise values to the group of users;
modify the metric value of the metric of the first user with the additional noise value based on the updated distribution;
receive, from the client device, a second query related to the aggregate metric of the group of users;
perform, in response to the second query, a second operation on the modified metric values of the metric of the first user and the group of users; and
provide, to the client device, a second response based on a result of the second operation.

19. The computing apparatus of claim 11, wherein the aggregate metric comprises at least one of an average after-hours metric or an average collaboration hours metric, the after-hours metric measure the operation of the application outside a time range, the collaboration hours metric measuring a frequency and duration of communications among users of the application, wherein the application comprises a communication application or a calendar application, wherein the query identifies an enterprise attribute of a user profile from the group of users.

20. A non-transitory computer-readable storage medium, the computer-readable storage medium including instructions that when executed by a computer, cause the computer to perform operations comprising:
access a metric value of a metric of each user from a group of users of an application, the metric indicating a measure of an operation of the application by a corresponding user;
generate a plurality of noise values, each noise value comprising a random value within a noise range, the noise range comprising a range of the metric values from the group of users;
define a distribution of the plurality of noise values to the group of users;
modify the metric value of the metric of each user with a corresponding noise value from the plurality of noise values based on the distribution;
receive, from a client device, a query related to an aggregate metric of the group of users;
perform, in response to the query, an operation on the modified metric values of the metric of the group of users; and
provide, to the client device, a response based on a result of the operation.

* * * * *